United States Patent [19]

Kronberg

[11] Patent Number: 5,054,023
[45] Date of Patent: Oct. 1, 1991

[54] "SMART" WATCHDOG SAFETY SWITCH

[76] Inventor: James W. Kronberg, 353 Church Rd., Beech Island, S.C. 29842

[21] Appl. No.: 350,953

[22] Filed: May 12, 1989

[51] Int. Cl.[5] ............................................. G06F 11/00
[52] U.S. Cl. .................................... 371/16.3; 371/14; 371/62
[58] Field of Search ................... 371/5.1, 5.3, 5.5, 14, 371/16.3, 62

[56] References Cited

U.S. PATENT DOCUMENTS

| 4,109,234 | 8/1978 | Davis | 340/52 B |
|---|---|---|---|
| 4,110,687 | 8/1978 | Sneed, Jr. | 324/133 |
| 4,405,982 | 9/1983 | Ruhnau et al. | 364/200 |
| 4,434,403 | 2/1984 | Chang | 328/120 |
| 4,538,273 | 8/1985 | Lasser | 371/62 |
| 4,586,180 | 4/1986 | Anders et al. | 371/62 |
| 4,611,295 | 9/1986 | Fowler | 371/62 |
| 4,745,542 | 5/1988 | Baba et al. | 371/14 |
| 4,809,280 | 2/1989 | Shonaka | 371/62 |

Primary Examiner—Charles E. Atkinson
Attorney, Agent, or Firm—Harold M. Dixon; Stephen D. Hamel; William R. Moser

[57] ABSTRACT

A method and apparatus for monitoring a process having a periodic output so that the process equipment is not damaged in the event of a controller failure, comprising a low-pass and peak clipping filter, an event detector that generates an event pulse for each valid change in magnitude of the filtered periodic output, a timing pulse generator, a counter that increments upon receipt of any timing pulse and resets to zero on receipt of any event pulse, an alarm that alerts when the count reaches some preselected total count, and a set of relays that opens to stop power to process equipment. An interface module can be added to allow the switch to accept a variety of periodic output signals.

6 Claims, 6 Drawing Sheets

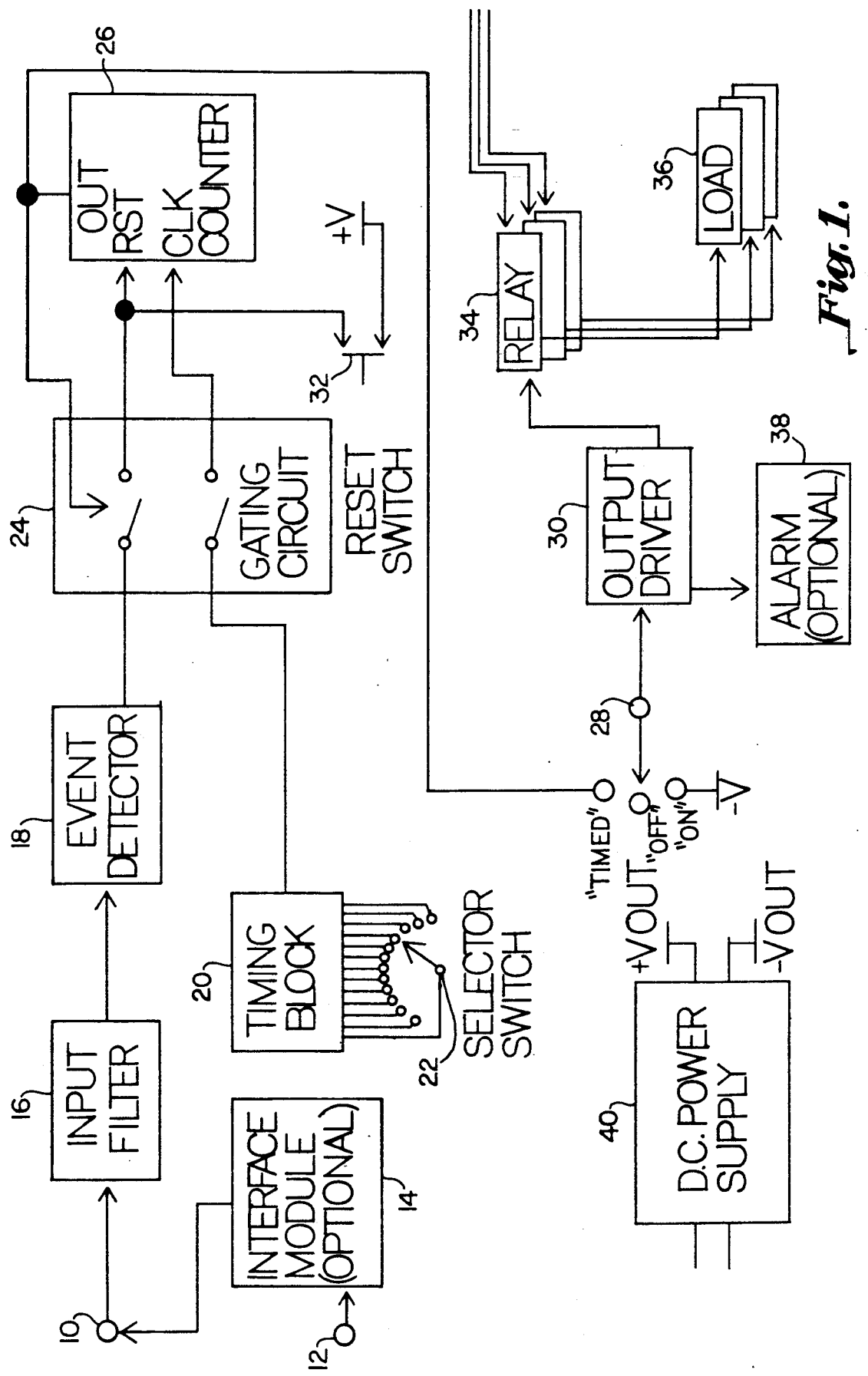

"SMART" WATCHDOG SAFETY SWITCH

CONTRACT STATEMENT

The United States Government has rights in this invention pursuant to Contract No. DE-AC09-76SR00001 between the U.S. Department of Energy and E.I. DuPont de Nemours & Co.

BACKGROUND OF THE INVENTION

1. Field of the Invention

The present invention relates to electronic devices that monitor transitions in electronic process control equipment or output signals and provide automatic shutdown of critical devices in case of failure.

2. Discussion of Background and Prior Art

The increasing use of automatic electronic control in industrial processes and laboratory automation encourages operation with little or no human supervision. In the case of control failure, however, critical devices such as heaters and pumps sometimes remain turned on. With controls inoperative, the resulting temperature or pressure excursions can cause equipment damage, product degradation, and possibly the release of hazardous substances into the environment. Because newer electronic controllers are microprocessor based, they are more vulnerable to power line disturbances; hence, even brief power line disturbances can cause computer memory or program loss.

If controller failure is likely to occur, backup control or shutdown systems are often used to sense controller failure and initiate appropriate alarms. To protect a commercial industrial process, however, many such devices would need to be connected to each other and to a set of master control relays. Even so, such shutdown systems do not act promptly on main controller failure but only when process variables already exceed normal working limits. Because of the lag times between sensing controller failure and shutdown action, the variables might go still further out of bounds before corrective measures took effect.

Many types of computer systems are guarded by "watchdog timer" circuits which detect malfunctions. Such a circuit is independent of the main computer circuitry and monitors some event which takes place periodically during normal computer operation, such as a pulse or other signal transition on some well-chosen logic line. In case of computer failure, the monitored signal takes on a constant value and no transitions appear. After some predetermined length of time, the "watchdog" responds to their absence by generating a "reset" signal which—unless there is a major malfunction—sends the computer into some known state from which normal operation can be restarted.

As with computer systems, many automatic process control systems have outputs which undergo cycles of change within fairly well-defined time periods. On controller failure, these changes cease.

The absence of an expected periodic change in a well-chosen process controller output signal within an appropriately selected time limit provides a strong and very prompt indication of controller failure and foretells the possibility of equipment, product or environmental damage if critical process equipment, such as pumps and heaters, are not shut down promptly by some backup control device. However, no commercially available product is presently known which functions in a "watchdog-like" manner to shut down critical process control equipment when this occurs.

SUMMARY OF THE INVENTION

An object of the invention is a method and apparatus for monitoring the output signal of process control equipment and for shutting down process equipment in the event of control equipment failure.

To achieve the foregoing and other objects and in accordance with the purpose of the invention, as embodied and broadly described herein, the invention comprises an input section to receive any periodically varying controller output, a filtering and peak-clipping section to remove electrical noise, and an edge detection section for identifying valid events in the output signal. The intervals between events are compared with an internal clock and counter. The delay of an expected event opens heavy-duty relays to shut off power to process equipment. During normal operation these relays are closed so that the switch is transparent to main controller signals.

Since the "smart" switch will normally complement a microprocessor based controller, microprocessor technology has been avoided in the design of the switch; for simplicity and robustness, all functions are hardwired, using fully static devices of proven ruggedness and reliability to assure correct operation in worst case scenarios.

The "smart" watchdog safety switch is a simple, versatile and direct method and apparatus for protecting critical processes in the event of controller failure. Its input section directly accepts all common logic, contact closure and some analog signals, and can be adapted for high level inputs by plugging in one of several industry-standard interfacing modules. Because the switch accepts a variety of inputs and rejects noise, it can be used with a wide variety of laboratory and process applications.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings:

FIG. 1 shows the present invention in block diagram form.

FIG. 2 comprised of FIGS. 2a–2i, shows the typical waveforms at various locations in the circuitry of the present invention plotted against a common time scale.

FIG. 3 comprised of FIGS. 3a–3g, shows some of the input connection schemes that can be used to increase the range of input signal types usable with the present invention.

Figures 6A, 6B:
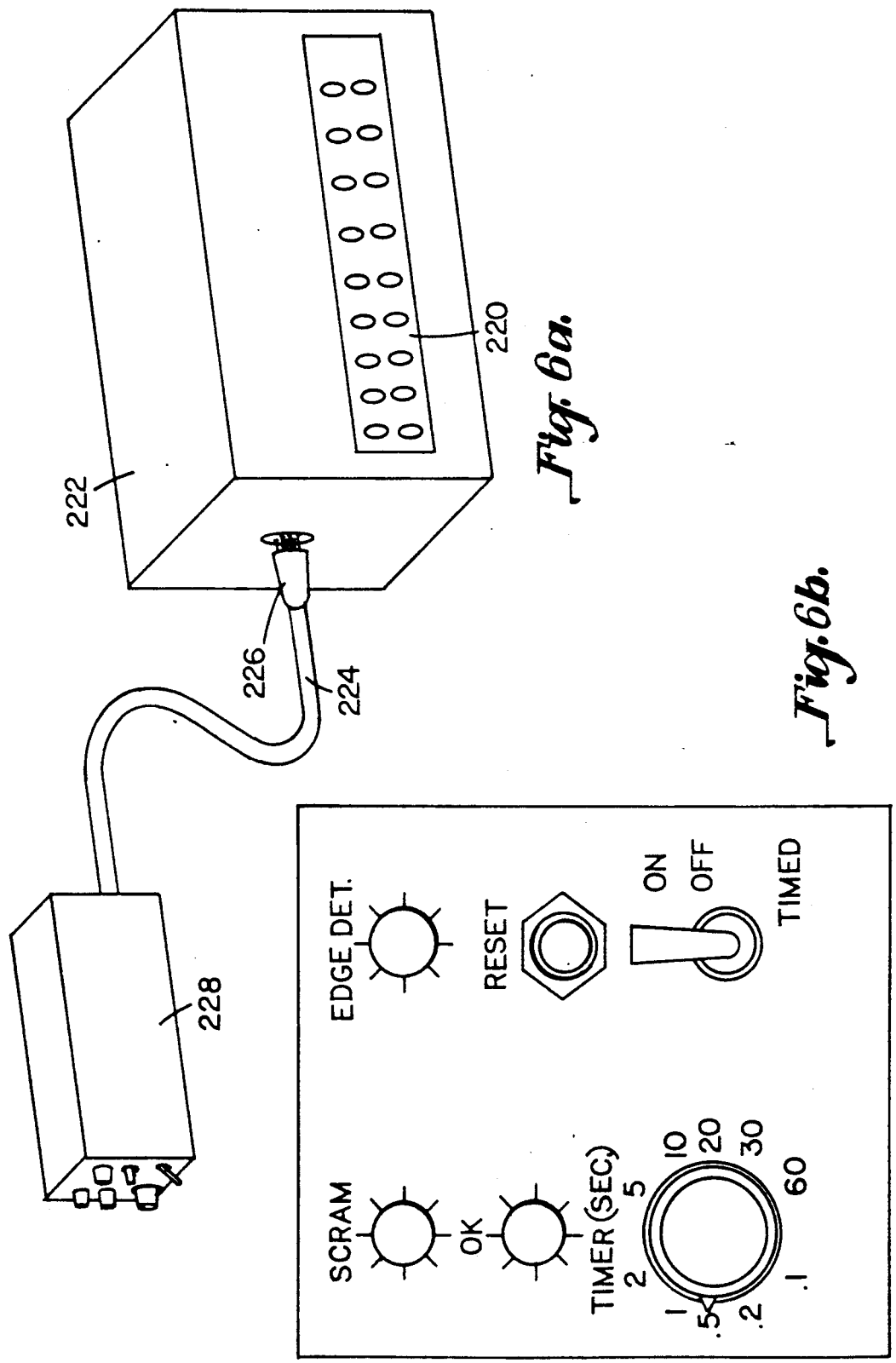

FIG. 6 comprised of FIGS. 6a and 6b, illustrates an example of a physical configuration of the present invention.

DETAILED DESCRIPTION OF THE INVENTION

Referring now to FIG. 1, it will be obvious to someone skilled in the art of electronic design that some of the blocks may represent specific groups of components or that portions of components may be shared among more than one functional grouping. Conceivably, most of the functions could be integrated on a single silicon chip, with a number of passive components, such as on-off switches and light-emitting diodes, externally connected.

The signal to be monitored is introduced at input 10. This signal is a relatively slow, periodic waveform generated by the controller at standard logic (low-voltage) levels plus higher frequency electrical noise picked up by the signal line. Alternatively, a high level A.C. or D.C. signal may be introduced at input 12 through one of several types of plug-in, industry standard interface modules 14, whose low-level output is connected to input 10.

Most of the noise is removed from the input signal by clipping and filtering techniques in input filter 16. A filtered output of input filter 16 enters an event detector section 18 where valid transitions in the signal are identified and marked by a series of short "event" pulses.

In a timing block 20, a train of timing pulses is continuously generated having a frequency determined by the position of selector switch 22. The timing pulses pass to a gating circuit 24, which normally allows free passage to a multistage binary counter 26 incremented by each timing pulse.

Event pulses also enter gating circuit 24, which normally also allows free passage of the event pulses to counter 26. Upon arrival of an event pulse, counter 26 is reset to zero; upward counting is resumed as new timing pulses arrive from timing block 20.

If no further event pulses arrive before a specified number of timing pulses (typically 2048, as shown in the present embodiment, or another power of 2), counter 26 is incremented and the output of counter 26 changes state from a logic "0" to a logic "1", signaling the attainment of the specified binary count. The output of counter 26 is applied both to gating circuit 24 and, through an optional three-position switch 28, to output driver 30. Alternatively, switch 28 may be omitted.

When logic "1" appears, gating circuit 24 blocks timing and event pulses from reaching counter 26, so that the count is frozen and the output of counter 26 remains at logic "1" until manually reset by reset switch 32.

With switch 28 in "TIMED" position, or with the switch omitted, output driver 30 is controlled by the output of counter 26. A logic "0" allows a current to energize one or more output relays 34, which then allow high-level current from the controller to reach one or more critical load elements 36. A logic "1" de-energizes relays 34 and prevents high-level current from reaching load elements 36. Simultaneously, an optional alarm 38 may be driven to signal operators that a controller malfunction has occurred.

With switch 28 in "ON" position, the output of counter 26 is held at logic "0", energizing relays 34 and allowing high-level current to pass freely to load elements 36. With switch 28 in "OFF" position, the output of counter 26 is held at logic "1", de-energizing relays 34 and turning load elements 36 unconditionally off. All functional blocks comprising the "smart" watchdog switch are powered by a D.C. power supply 40, typically furnishing 12 volts. This supply is preferably well regulated and driven by the same A.C. line which powers the controller.

Through the interactions just described, prompt shutdown of critical load elements 36 is implemented whenever valid transitions fail to arrive at input 10 (or, alternatively at input 12) within the period set by timing block 20 and counter 26. The combination of timing block 20 and counter 26 can provide stable timing intervals ranging from a fraction of a second to several hours or days.

After shutdown, a manual override is required, either through reset switch 32 or through switch 28 to restore operation, even if valid transitions reappear at input 10, to assure that human attention has been drawn to the shutdown and, at least in principle, that the problem causing it has been corrected.

FIG. 2 shows waveforms characteristic of the system operation in the preferred embodiment. These are plotted on a common time scale for easy comparison. Refer also to FIG. 1.

Figure 2A:

In normal operation, the controller output takes the form of a relatively slow, periodic waveform of FIG. 2a. This may consist of logic pulses at any of the commonly encountered logic levels (TTL-compatible, open collector, or MOS logic types running at any usable supply voltage), of contact closures to ground or to a positive supply voltage, of analog voltage or current waveforms, of serial data signals at low baud rates, or—with the addition of a plug-in interface module 14—of high level A.C. or D.C. signals. Pulses may be rectangular, trapezoidal or of any other common or convenient form. Typical repetition rates may range from about ten per second to one per minute; in unusual cases, other rates could also be used.

Figure 2B:
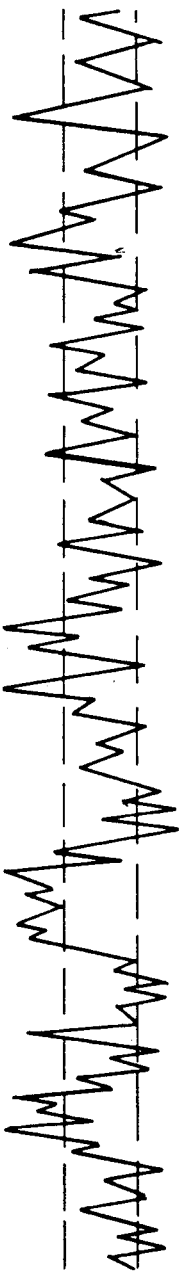
Figure 2C:
Figure 2D:
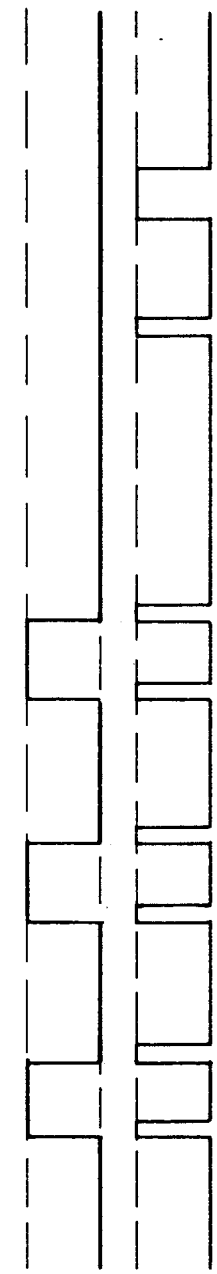
Figure 2E:
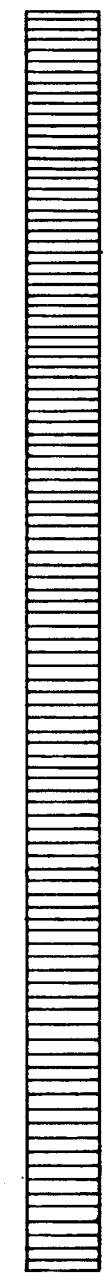

Controller output, in the course of transmission to the invention, can become so badly contaminated with electrical noise that the resulting signal, shown in FIG. 2b, bears little resemblance to the original. Peak clipping and low-pass filtering in input filter 16 reconstruct the approximate form, as shown in FIG. 2c, which is further sharpened to a rectangular pulse train of FIG. 2d in event detector 18. From each rising or falling edge, a brief rectangular event pulse is generated, creating a train of event pulses as shown in FIG. 2e.

Figure 2F:
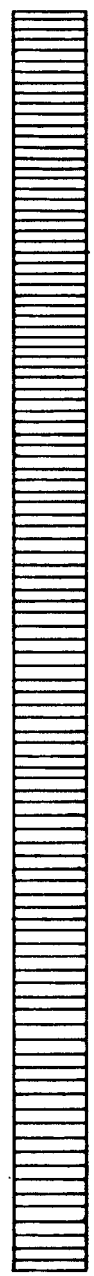
Figure 2G:

When the output of counter 26 is at logic "0", gating circuit 24 allows free passage of event pulses and timing pulses, the latter generated by timing block 20 and shown by FIG. 2f, to counter 26. The resulting count is shown symbolically by the waveform in FIG. 2g where amplitude represents the number of timing pulses counted since the latest event pulse. As seen in FIG. 2g, arrival of an event pulse "zeros" counter 26. As timing pulses continue to arrive, the count rises until another event pulse arrives and zeros counter 26 again. This repeating sequence of events is characteristic of normal operation.

Figure 2H:
Figure 2I:

If no event pulse is received before the counter reaches some maximum count, the output of counter 26 changes to logic "1", as shown in FIG. 2h. At this, gating circuit 24 ceases to allow the passage of either timing or event pulses. This causes the count to be frozen, holding the output of counter 26 in logic "1". The presence of a logic "1" disables output driver 30, de-energizes relays 34 and turns off critical loads 36.

When reset switch 32 is pressed, a reset pulse is sent to counter 26, which responds as it would to an event pulse as though gating circuit 24 were open. The count is zeroed, returning the output of counter 26 to logic "0"; at this, gating circuit 24 begins passing event and timing signals again, output driver 30 re-energizes relays 34, and normal operation resumes provided that a valid event pulse train is again present. If not, the count will again increase to its maximum value and critical loads 36 will again be disabled until reset switch 32 is manually reset.

FIG. 3 shows a number of different methods by which the invention may be connected to external signal sources.

Figure 3A:
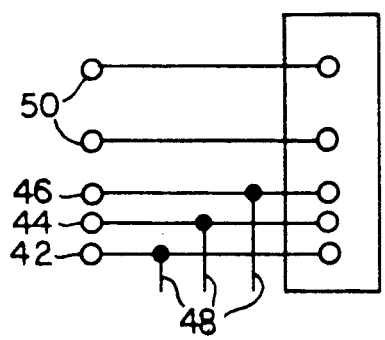

In FIG. 3a terminal 42 is normally connected to signal ground, and terminal 44 to the signal to be monitored. Terminal 46 is a positive supply terminal used in some input configurations.

Terminals 42, 44 and 46 are tied internally to the input circuitry through lines 48, and also to sockets into which an industry-standard interface module 14, described below, may be plugged to accommodate high-level inputs at terminal pair 50. Three on-board jumpers or switches 52, 54 and 56 are provided to match differing low-level input signal types. Jumper 52 provides a current path to ground; jumpers 54 and 56 are mutually exclusive, with jumper 54 enabling a noise filter and jumper 56 bypassing it.

Figure 3B:
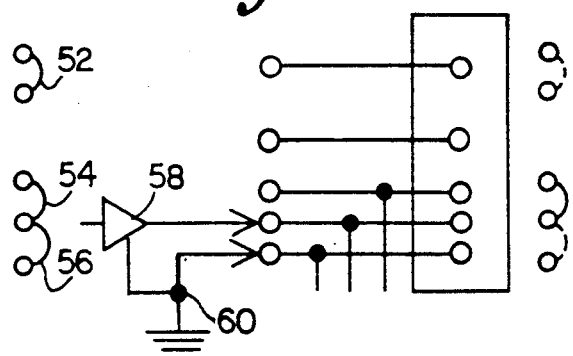

FIG. 3b shows the input terminals of input filter 18 with a low-level, voltage-type input signal source 58. This may be any TTL, DTL, RTL or other nominally TTL-compatible logic device, any CMOS or NMOS logic device operated within the rated supply-voltage range (3 to 18 volts), or any operational amplifier or other source of analog voltage signals, provided that the resulting voltage range equals or exceeds that of standard TTL voltages. The resulting signal is connected to terminal 44, and signal ground 60 is connected to terminal 42. Jumper 54 is closed, enabling input filter 16; jumpers 52 and 56 are open.

Figure 3C:
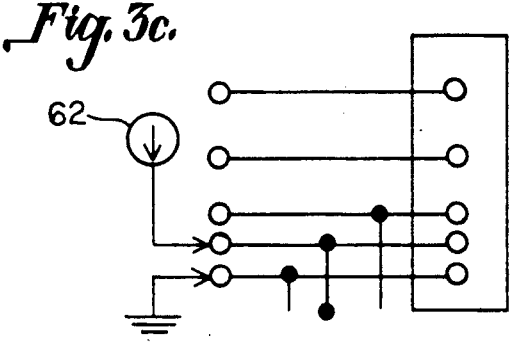

FIG. 3c shows the same terminals with a low-level, current type input signal source 62. This may be a 20-milliampere digital or a 4-to-20-milliampere analog signal. Jumper 52 is closed, providing a path to ground through resistance so that the current generates a voltage signal at terminal 44. Jumper 54 is closed and jumper 56 is open, enabling the input filter 16.

Figure 3D:
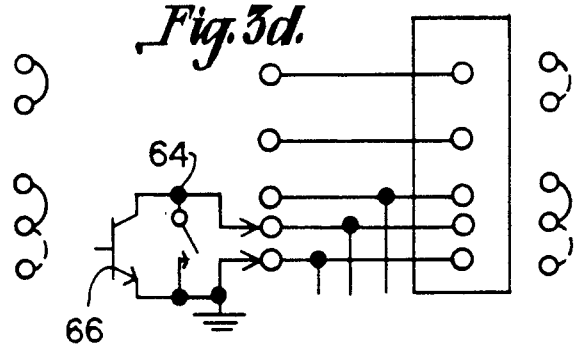

FIG. 3d shows the same terminals with a contact-closure 64 or open-collector 66 type input signal sources referenced to ground. Connections and jumper positions are as with a voltage-type input: jumper 54 closed, 52 and 56 open. If desired multiple input devices may be connected in a "wired-OR" (parallel) configuration. No pull-up resistor is necessary.

Figure 3E:
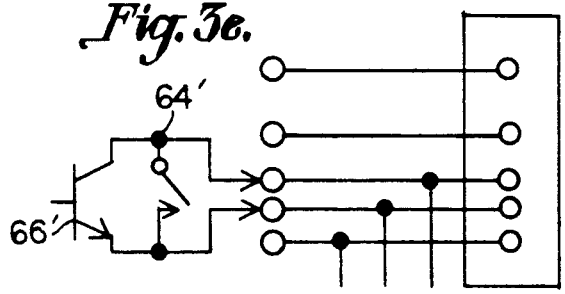

FIG. 3e shows interface module 14 with contact-closure 64' and transistor-type 66' input signal sources (such as optical isolators or fiber-optic data receivers) when these must be referenced to a positive supply potential. Jumper 52 is closed, providing a path to ground; jumper 54 is closed and jumper 56 is open, enabling input filter 16. As with contact closure to ground, a "wired-OR" configuration is possible. Positive voltage may be supplied by terminal 46 as shown, or by an external D.C. supply from 5 to 10 volt. Care should be taken that total off-state leakage does not exceed 4 milliamperes.

Figure 3F:
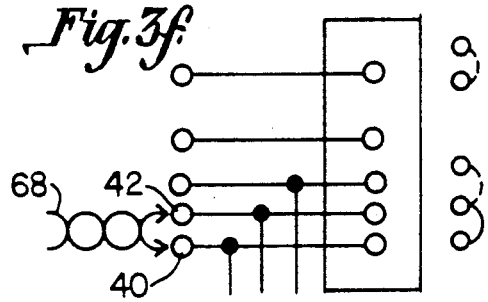

FIG. 3f shows the same terminals with a serial data line 68 used as the input signal source. Such a line carries a voltage rapidly switching between ground or negative value and a positive value, typically carrying data formatted as ASCII characters, as specified in EIA standards RS-232C/D, RS-422, RS-423 or RS-449. Data line 68 is connected to terminal 44, and "signal common" to terminal 42. With RS-422, in which the lines form a balanced pair, either line may be used as "data" and the other as "common". Jumpers 52 and 54 are open, and jumper 56 is closed; this disables the input filter 16, so that the brief pulses typical of data transmission may pass. The circuit will respond to any transmitted character. Lower baud rates (300 baud or less) are preferable to higher ones. This configuration may be used only in areas of low electrical noise.

Figure 3G:
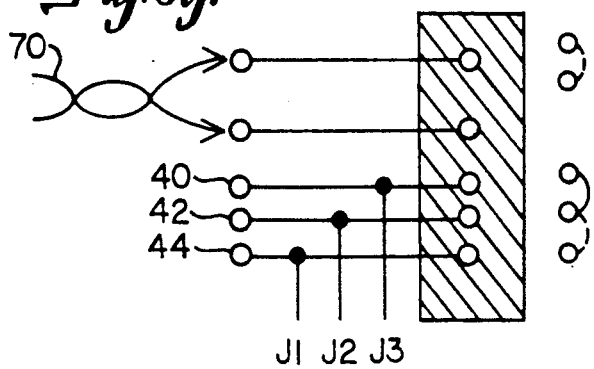

FIG. 3g shows the same terminals with an interface module 14 in place, this module being connected at terminals 50 to a switched, high-level A.C. or D.C. line 70, such as one directly driving process equipment. One of several types of plug-in, optically isolated interface module 14 (IAC5, IAC5A, IDC5, IDC5A or IDC5B) may be used, depending on the application. This permits safe sensing of D.C. signals ranging from 4 to 280 volts or A.C. from 15 to 240 volts R.M.S., with isolation up to 4000 volts. Compatible (and virtually interchangeable) interface modules are made by Potter & Brumfield, OPTO-22, Gordos, Crydom and others.

Figure 4:
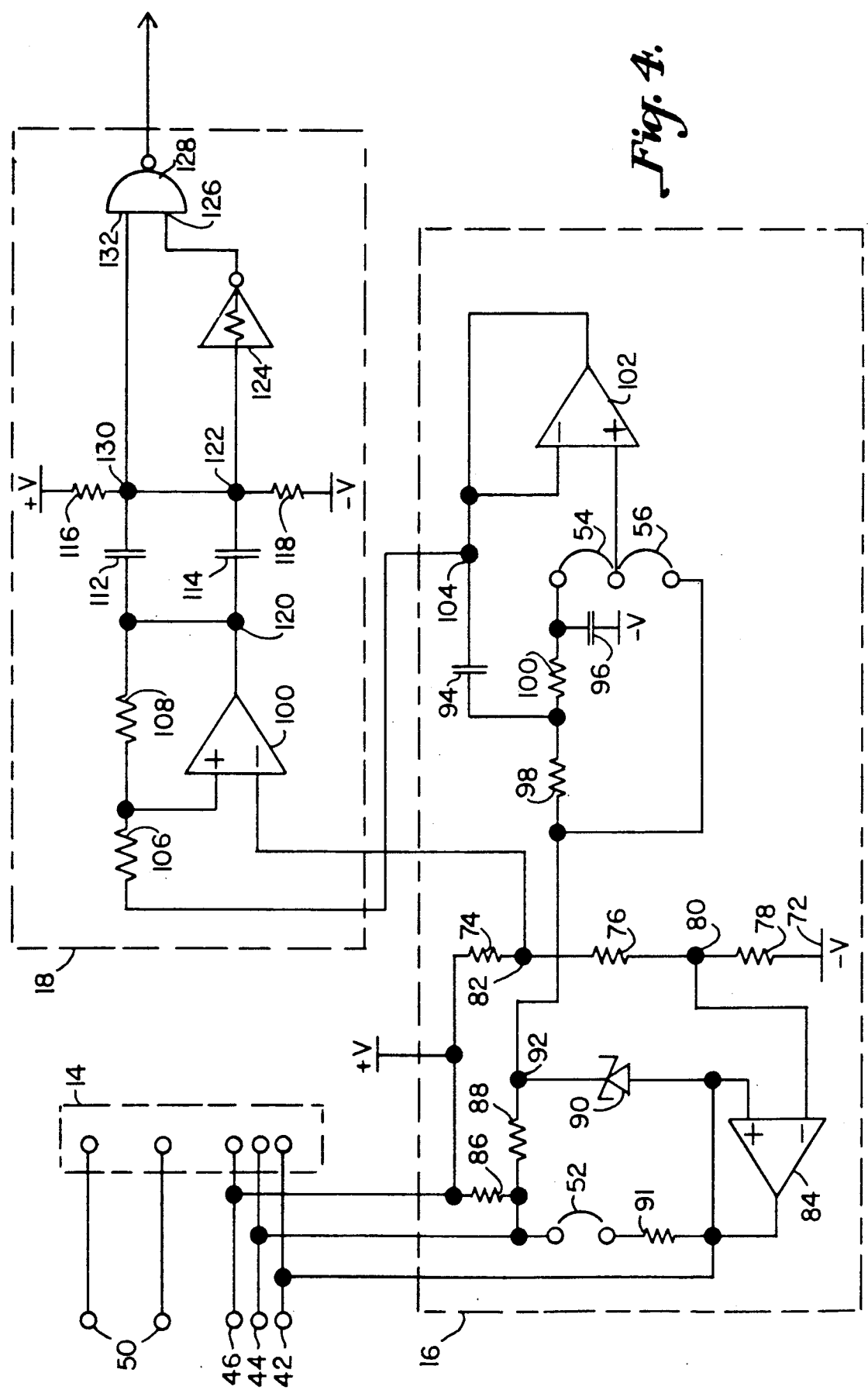
FIG. 4 is a detailed schematic diagram of the input, filtering and edge-detection sections of the preferred embodiment of the present invention.
Figure 5:
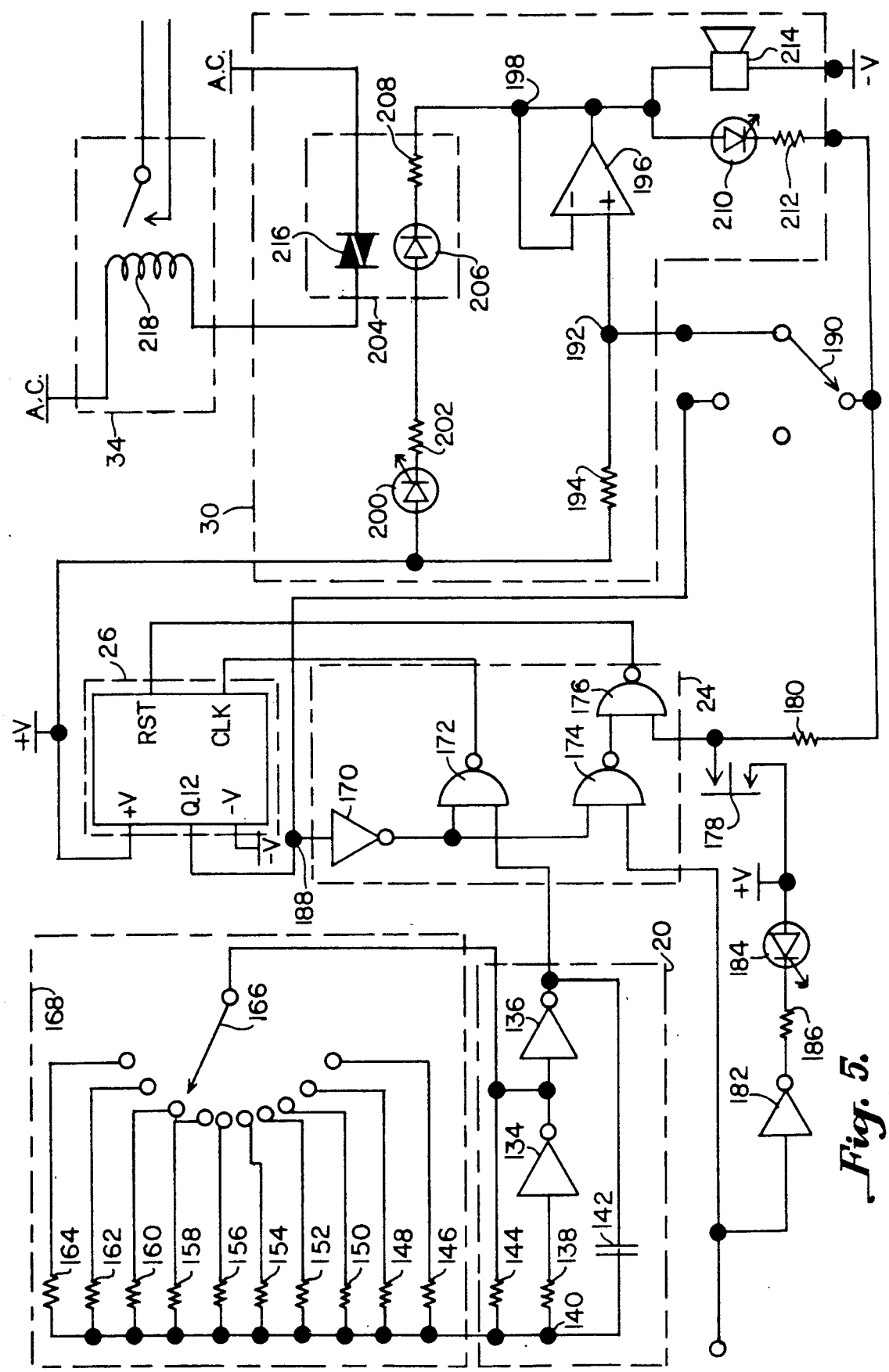
FIG. 5 is a detailed schematic diagram of the timing, counter, latch and output sections of the preferred embodiment of the present invention.

FIGS. 4 and 5 show detailed schematic diagrams of the functional blocks shown in FIG. 1, according to the preferred embodiment. It will be obvious to someone skilled in the art of electronic design that many other methods exist by which the same circuit functions could be implemented.

In both of these figures, the symbols "+V" and "−V" indicate connection to the positive and negative terminals, respectively, of power supply 40, which is not shown in FIGS. 4 or 5. Power connections to logic devices and operational amplifiers, also not shown, are assumed to be made to these lines.

In these figures and their descriptions, values given for engineering quantities such as volts, are representative approximate and not exact values.

Passive components may be of any commonly-available types. Resistors are assumed to be $\frac{1}{4}$ watt types, though other ratings are permissible in many instances; required ratings higher than $\frac{1}{4}$ watt are noted where desirable. Capacitors are rated 20 volts or higher, with monolithic ceramic types preferred for values of 0.1 microfarad or higher.

Operational amplifiers are any common type with outputs able to sink and source 20 milliamperes or more. Slight preference is given to single-supply-voltage types such as the 124 series; compatible devices are made by RCA, Signetics, Teledyne and others. The preferred embodiment uses one type LM324 package containing four amplifiers.

Logic devices are preferably 4000-series CMOS; compatible devices are made by Motorola, Harris, RCA, National Semiconductor and others. The preferred embodiment uses one type 4049 package containing six inverters, one type 4011 package containing four two-input NAND gates, and one type 4040 twelve-stage binary counter. Signals at 4000-series logic inputs are read as "0" when below the midpoint of "+V" and "−V", and as "1" when above this midpoint. 4000-series logic outputs are at or near "+V" when at logic "1", and at or near "−V" when at logic "0".

FIG. 4 is a schematic diagram of input filter 16 and event detector 18 shown in FIG. 1.

Input filter 16, "+V" and "−V" are connected at 46 and 72, respectively. A voltage divider consisting of resistors 74, 76 and 78 bridges these lines and furnishes two constant reference voltages: about 3.4 volts at terminal 80, and about 4.8 volts at terminal 82, above "−V". An operational amplifier 84 buffers voltage from terminal 80 to terminal 42 at low impedance. Voltage at terminal 42, 3.4 volts above "−V", is hereafter signified by "common" since in most cases the "common" or "ground" input signal line is connected to terminal 42. In the following description, all voltages are referenced to common (and not to "−V") unless otherwise stated.

Bridging terminal 46 ("+V") and common is a second voltage divider network, formed by resistors 86 and 88 and diode 90. Diode 90 is a Zener or avalanche-type silicon reference diode rated at 3.9 volts, biased so that in normal operation current flows through it in reverse or avalanche fashion and terminal 92 is held 3.9 volts above common. Resistors 86 and 88 are chosen so that, in conjunction with diode 90, they set terminal 44 4.6 volts above common when no outside connections are present. When a low-level signal input (one not requiring a plug-in interface module 14) is used, its "high" side (if any) is typically connected to terminal 44 and its "low" side to terminal 42.

Bridging terminal 44 and common is a resistor 91 in series with jumper 52. The value of resistor 91 is chosen so that current flowing through it (FIG. 3c, 3e) generates a voltage above common which may be read as a logic level. For other input types, jumper 52 is removed and no current flows along this path For high-level signal inputs, an interface module 14 appropriate to the signal type is inserted and connected to terminal pair 50, as was shown in FIG. 3. When an input signal of the appropriate type is present, the voltage at terminal 44 is pulled down to 0.5 volts or less; when no input signal is present, terminal 44 floats at 4.6 volts.

If terminal 44 is pulled above 4.6 volts by an external source, the reverse current of diode 90 increases but, because of diode characteristics, diode 90 continues to hold terminal 92 at 3.9 volts. If terminal 44 is pulled below 4.6 volts, diode 90 similarly maintains terminal 92 voltage at 3.9 volts until terminal 44 drops below 3.9 volts; thereafter resistor 88 carries little or no current, diode 90 ceases to conduct in the reverse direction, and voltage at terminal 92 becomes roughly equal to voltage at terminal 44. If terminal 44 is pulled more than 0.7 volts below common, diode 90 begins to conduct in the forward direction and prevents the voltage at terminal 92 from dropping below this voltage. Diode 90 thus "clamps" the voltage at 92 between levels of +3.9 and −0.7 volts relative to common; between these levels the voltage at terminal 92 follows terminal 44, but any peaks above or below these limits are "clipped off."

Peak clipping removes or reduces some types of high-frequency electrical noise, usually generated by switching, and commonly referred to as "spikes". It is followed in the preferred embodiment by active filtering, which removes or reduces the audio-frequency noise characteristic of steady-state A.C. interaction, commonly known as "hum". Since this type of filtering is not desirable when the events being monitored also have audio-frequency components, as in serial data transmission, filter 16 may be disabled to permit the use of these input types, although at some loss in noise immunity. Jumpers 54 and 56 enable and disable, respectively, filter 16.

The clipped signal passes from terminal 92 to a second-order filter made up of capacitors 94 and 96, resistors 98 and 100, and operational amplifier 102. The exact response of this filter depends on the values and the ratios of the resistors and capacitors. The preferred filter has a "0.1-dB Chebyshev" response with 6-Hertz corner frequency, obtained when resistor 98 and resistor 100 are equal, capacitor 94 is about 2.2 times the value of capacitor 96, and the R-C time constant calculated from resistor 98 and capacitor 94 is about 0.04 seconds. This filter has a relatively flat response for frequencies below 6 Hertz and attenuates all signals above, with attenuation increasing about 40 decibels per decade. Differing filter responses could be tailored for specific applications by adjusting the values of these components or by adopting a different type of filtering circuit.

Leaving input filter 16, the filtered signal passes from terminal 104 to event detector 18. The voltage from terminal 82, derived from the voltage divider consisting of resistors 74, 76 and 78 and 1.4 volts above common, also passes from input filter 16 to event detector 18. Both of these signals are fed to a Schmitt trigger consisting of resistors 106 and 108 and operational amplifier 110, which generates a rectangular waveform based on the comparative magnitudes of voltages 82 and 104.

A symmetrical R-C network, formed by capacitors 112 and 114 and resistors 116 and 118, generates short exponential pulses at each rising or falling edge of the signal at terminal 120. If visible indication of valid input events is desired (see the description of FIG. 5), the R-C time constants of resistor 116-capacitor 112 pair and resistor 118-capacitor 114 pair should each be about 0.1 second; if not, these may be much shorter.

A positive rising-edge pulse at terminal 122 is inverted by logic gate 124, forming a negative pulse which passes to one input 126 of logic gate 128. A negative falling-edge pulse at terminal 130 passes directly to the other input 132 of logic gate 128, which performs a NAND function upon the two inputs, generating a positive output pulse upon either a rising or falling edge of the signal into event detector 18. Event pulses are sent to gating circuit 24, shown in FIG. 5.

FIG. 5 is a schematic diagram of timing block 20, interval selector switch 22, gating circuit 24, counter 26, output driver 30, and associated components.

Timing block 20 comprises inverting logic gates 134 and 136 connected in cascade, resistor 138 connected between the input of gate 134 and terminal 140, and capacitor 142 connected between terminal 140 and the output of gate 134. With a second resistor 144 connected between terminal 140 and the output of gate 134, and having half the resistance of resistor 138 or less, resistor 138, capacitor 142, gate 134 and gate 136 form an astable multivibrator with a period of oscillation roughly 2.3 times the R-C constant calculated from capacitor 142 and resistor 144. This multivibrator generates a train of equally spaced timing pulses.

In the preferred embodiment, the single resistor 144 is replaced by a group of ten different resistors denoted by reference characters 146, 148, 150, 152, 154, 156, 158, 160, 162 and 164, selectable through multiposition rotary switch 166, and having values exponentially increasing by successive factors of about two, with resistor 138 several times higher still. This provides ten different timing intervals, each proportional in duration to the resistance value of the selected resistor. Resistors 146 through 164 are conveniently soldered directly to the terminals of switch 166, forming two-leaded assembly 168 which may be handled and mounted as a unit.

Alternatively, timing block 20 could be modified by using a different number of resistors and switch positions, a different ratio or ratios between successive resistors, or a fixed resistor pair, resistors 138 and 144, with switch 166 selecting multiple capacitors in place of capacitor 142. This switched-capacitor method has been used successfully in an alternate embodiment. For some applications, such as integration of most circuit functions onto a single chip, some completely different method of generating the timing pulses might be preferable.

The timing pulses pass to gating circuit 24, consisting of inverter 170 and NAND gates 172, 174 and 176. Inverter 170 normally receives a logic "0" (low) signal from counter 26 and presents a logic "1" (high) signal to inputs of gates 172 and 174, so that the output of each of these gates simply inverts the signal received at the other input. This condition is assumed to be true in the following description, except where noted. If inverter 70 receives a logic "1" from counter 26, it sends a logic "0" to gates 172 and 174, forcing both their outputs to logic "1" regardless of other inputs.

Applied to the second input of gate 172, timing pulses pass (incidentally being inverted) to the "clock" (CLK) input of counter 26, causing its count to increase by one each time a pulse is received. In the preferred embodiment, counter 26 consists of a single component, a type 4040 CMOS integrated-circuit binary counter of twelve stages. An alternate embodiment combines the functions of counter 26 and timing block 20 by using a type 4541 integrated counter-timer circuit and a few additional components.

Logic "1" pulses generated in event detector 18, each representing a valid input of the process controller, pass from gate 128 to gate 174, appear as logic "0" pulses at its output, and pass in turn to one input of gate 176. The other input of gate 176 is connected to momentary, normally closed pushbutton switch 178, which usually holds it shorted to "+V"; i.e. at logic "1". Pressing switch 178 releases the short, allowing resistor 180 to pull the line down to logic "0". Alternatively, a different switching arrangement might be used to pulse the second input of gate 176. For example, switch 178 could be a normally open type connected to "−V" and resistor 180 could be connected to "+V", producing a negative pulse on closure of the contacts of switch 178.

Optionally, event pulses may also be applied to the input of an inverter 182, driving light-emitting diode 184 (preferably amber) with current limited by resistor 186. This causes diode 184 to emit a visible flash whenever a valid input signal event has been detected.

When a logic "0" is applied to either input of gate 176, by a negative event pulse from the output of gate 174 or by a reset pulse from switch 178, the output of gate 176 switches to logic "1". This output is connected to the "reset" (RST) input of counter 26, so that whenever this occurs, the resulting positive pulse resets the count to zero.

For simplicity, since a positive pulse is actually applied to reset counter 26, this "RST" function was represented in FIG. 1 by a simple momentary pushbutton connection to +V.

Alternatively, gating circuit 24 could be constructed using some other means, such as analog switches or small electromechanical relays, to pass or block pulses from event detector 18 or timing block 20. While it is important that event pulses undergo no net inversion while passing through gating circuit 24, timing pulses may be inverted or not, as may be most convenient.

When counter 26 receives a "RST" pulse, all binary counter stages are reset to logic "0". As "CLK" pulses arrive, these stages successively switch to logic "1" and back again, with the first transition in stage "n" occurring after $2^{n-1}$ "CLK" pulses. Thus, if 2048 pulses arrive between "RST" pulses—that is if no valid input signal transition is sensed during the time needed for timing block 20 to generate this many pulses—the twelfth binary counter stage generates a logic "1", which appears at output terminal 188. If "RST" is received before this number of "CLK" pulses, no transition at terminal 188 occurs and the signal remains at logic "0".

Terminal 188 is connected both to inverter 172, controlling gating circuit 24, and to switch 190, controlling output driver 30.

When terminal 188 is at logic "0", inverter 172 holds the corresponding inputs of gates 174 and 176 at logic "1", allowing both "CLK" and "RST" signals to pass through to counter 26. When terminal 188 switches to logic "1", however, inverter 170 pulls the inputs of gates 172 and 174 to logic "0" and prevents any further change in the counter. Since a "RST" pulse originating in switch 178 does not pass through gate 174, however, it can reach the counter despite the state of terminal 188; hence, a manual reset is still possible.

Optional three-position selector switch 190 either connects terminal 192 to terminal 188, shorts it to "−V" producing a logic "0", or leaves it open so that resistor 194 pulls it to logic "1". These correspond, respectively, to "TIMED", "ON", and "OFF" states of the output driver, with the second two states constituting a manual override of the "Watchdog" function. Since the center position is preferably "OFF" and corresponds to the "open" state of terminal 192, switch 190 is preferably an "ON-OFF-ON" type, single-pole, 3-position toggle switch. If manual override is not desired, terminals 188 and 192 may simply be connected together and switch 190 may be omitted.

The voltage at terminal 192 is buffered by operational amplifier 196. When terminal 192 is at logic "0" ("ON"), the voltage at terminal 198 is held close to "−V"; current then flows through optional light-emitting diode 200 (preferably green) to signal an "ON" condition, through resistor 202, and through the low-voltage circuit of optically-isolated solid state relay 204, typically consisting of infrared diode 206 and resistor 208. When terminal 192 is at logic "1" ("OFF"), the voltage at terminal 198 is held close to "+V"; current then flows through optional light-emitting diode 210 (preferably red) and resistor 212 to signal an "OFF" condition. If an audible alarm is desired, a D.C.-driven electronic alarm 214 requiring little supply current, such as a Malory Sonalert, may be connected in place of 212 or in parallel with it and diode 210.

Solid state relay 204 is preferably an OAC5 or OAC5A plug-in output module belonging to the same series as interface module 14 described under FIG. 3. It may be located remotely from the low-level D.C. circuitry, if desired. When low-level D.C. current flows through diode 206, infrared light shines through a transparent insulator, turning on solid-state switch 216 and allowing high level A.C. current to flow through relays 34 to loads 36.

An A.C. "hot" line is connected to one terminal of switch 216, the other terminal, to coil 218 of A.C.-driven electromechanical relays 34; the other side of coil 218 is connected to an A.C. "neutral" source. The type of relays 34, the number of contacts (only one pair is shown here) and current rating are determined by the application. For some applications, multiple relays 34 may be connected with coils parallel to provide a large number of contact pairs. When energized, relays 34 connect to high-level voltage lines, allowing current to flow from the controller to critical loads as described in the previous sections. Alternatively, a pilot relay 34 may in turn drive one or more heavy-duty output relays connected to the high level lines.

FIG. 6 shows one possible mechanical arrangement of the invention, designed for convenient installation in a control panel along with other process-control equipment. All exterior connections are made at barrier strips 220 on large "rear" module 222. Module 222 contains power supply 40, input interface module 14 (if used), output solid state relay 204, and electomechanical relays 34. Flexible multiconductor cable 224, attached to module 222 by connector 226, runs to small "front" module 228, which may conveniently be mounted on or beside an existing control panel with bulkier "rear" module 222 out of the way behind or below the control panel. Only low-level D.C. is present in cable 224 and module 228.

The faceplate of "front" module 228 carries all control switches and LED indicators. A faceplate layout is also reproduced showing the panel labels and, for switch 166, the nominal time settings for each switch position, as used in a preferred embodiment.

Typical resistor and capacitor values for the preferred embodiment of the invention are listed below. Each resistor entry for timing block 20 is followed by the calculated multivibrator frequency and the nominal time delay between "RST" and the rising edge of a timing pulse, both for the resistor 138 and capacitor 142 values listed. A typical value for resistor 208, sealed inside relay 204 and not user-accessible, is 220 ohms.

91—120 ohms (rated 1 W; all other ¼ W)
186, 202—330 ohms
212—680 ohms
76, 88—2000 ohms
78—4700 ohms
74, 86, 106, 180, 194—10000 ohms
116, 118—1,000,000 ohms
146—3300 ohms, 18,800 Hz, 0.1 sec.
148—7500 ohms, 9500 Hz, 0.2 sec.
150—20,000 ohms, 3860 Hz, 0.5 sec.
152—43,000 ohms, 1840 Hz, 1 sec.
154—82,000 ohms, 980 Hz, 2 sec.
156—220,000 ohms, 370 Hz, 5 sec.
158—430,000 ohms, 188 Hz, 10 sec.
160—820,000 ohms, 99 Hz, 20 sec.
162—1,200,000 ohms, 67 Hz, 30 sec.
164—2,400,000 ohms, 34 Hz, 60 sec.
94—0.22 uF
96, 112, 114—0.1 uF
142—0.0056 uF The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. Method for monitoring a process having a periodic output in order to protect process equipment in the event of a controller malfunction, said method comprising the steps of
    generating a series of timing pulses, each timing pulse in said series spaced from a next timing pulse in said series by a constant time interval;
    filtering noise from said periodic output;
    generating an event pulse for each valid change in magnitude of said filtered output;
    incrementing a counter upon the arrival of each timing pulse;
    resetting said counter to zero upon the arrival of each event pulse;
    blocking incoming event pulses if said counter is incremented above a selected binary count; and
    issuing an alarm if said selected binary count is reached.

2. The method of claim 1 further comprising the step of shutting off power to process equipment if said selected binary count is reached.

3. The method of claim 2 wherein the step of filtering is accomplished by filtering high frequencies from said output.

4. The method of claim 3 wherein the step of filtering is accomplished by clipping peaks from said output.

5. An electrical device for monitoring a process having a first periodic output, said device for protecting process equipment in the event of a controller malfunction, said device comprising:
    an interface module for receiving said first periodic output and generating a second periodic output;
    a filter in operational connection with said interface module for removing high frequency noise from said second periodic output;
    an event detector in operational connection with said filter for detecting valid changes in said filtered second periodic output;
    a timing pulse generator for generating timing pulses at regular intervals;
    a counter in operational connection with said timing pulse generator and said event detector, said counter incrementing a count on receiving any of said timing pulses and reseting said count to zero on receiving any of said event pulses, said counter blocking said timing pulses and said event pulses if said count reaches a selected total count;
    an alarm in operational connection with said counter for issuing an alarm if said count reaches said selected total count; and
    a series of relays in operational connection with said counter and said process equipment, said relays being normally closed so that power from a power source can flow to said process equipment and being opened if said counter reaches said selected total count.

6. The electrical device of claim 5 wherein said filter clips peaks from said second periodic output.

* * * * *